(12) United States Patent
Wickeraad

(10) Patent No.: US 6,247,137 B1
(45) Date of Patent: Jun. 12, 2001

(54) DELAYING CLOCK AND DATA SIGNALS TO FORCE SYNCHRONOUS OPERATION IN DIGITAL SYSTEMS THAT DETERMINE PHASE RELATIONSHIPS BETWEEN CLOCKS WITH RELATED FREQUENCIES

(75) Inventor: John A. Wickeraad, Granite Bay, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/553,737

(22) Filed: Apr. 20, 2000

Related U.S. Application Data

(63) Continuation of application No. 09/365,055, filed on Jul. 30, 1999.

(51) Int. Cl.$^7$ ........................................... G06F 1/04
(52) U.S. Cl. ............................. 713/401; 713/503
(58) Field of Search ........................... 713/400, 401, 713/500, 501, 503, 600

(56) References Cited

U.S. PATENT DOCUMENTS

| | | | |
|---|---|---|---|
| 4,841,551 | * 6/1989 | Avaneas | 375/371 |
| 5,115,455 | * 5/1992 | Samaras et al. | 375/354 |
| 5,870,446 | * 2/1999 | Mahan et al. | 375/371 |
| 5,905,391 | * 5/1999 | Mooney | 327/161 |
| 6,005,412 | * 12/1999 | Ranjan et al. | 326/63 |
| 6,115,322 | * 9/2000 | Kanda et al. | 365/233 |

* cited by examiner

*Primary Examiner*—Dennis M. Butler
(74) *Attorney, Agent, or Firm*—David A. Plettner

(57) ABSTRACT

A method and apparatus forces synchronous operation in a system that determines a phase-based relationship between two clocks by providing selectable delays of clock and data signals. A sending IC transmits data to the receiving IC over a data bus, and provides a strobe (clock) signal to validate data at the receiving IC. The phase relationship between the strobe signal and the internal clock of receiving IC is initially unknown. Within the receiving IC, the strobe signal is used to form four clock signals that clock data into four flip flops using a round robin scheme. Each of the round robin flip flops has a valid read window, and pair of multiplexors route the outputs of the round robin flip flops to a pair of flip flops that are clocked using internal clocks of the receiving IC. A select signal in the clock domain of the receiving IC is provided to the pair of multiplexors. The select signal can have one of two possible orientations. A phase detection circuit selects the proper orientation. Asynchronous behavior can occur if the initial timing of the select signal is close to the point at which the phase detection circuit decides whether to toggle the select signal, thereby making it difficult to debug hardware bugs associated with the orientation of the select signal. The present invention solves this problem by providing a selectable delay capable of delaying data and strobe signals by either one or three validation edges of the strobe signal, or not delaying the data and strobe signal, thereby forcing a particular orientation of the select signal and possibly causing an intermittent bug to become a repeatable bug.

1 Claim, 12 Drawing Sheets

DELAYING CLOCK AND DATA SIGNALS TO FORCE SYNCHRONOUS OPERATION IN DIGITAL SYSTEMS THAT DETERMINE PHASE RELATIONSHIPS BETWEEN CLOCKS WITH RELATED FREQUENCIES

CROSS REFERENCE TO RELATED APPLICATION

The This application is a continuation of U.S. application Ser. No. 09/365,055 to Paul L. Rogers, which was filed on Jul. 30, 1999, is entitled "A Method and Apparatus for Automatically Determining the Phase Relationship Between Two Clocks Generated from the Same Source", and is assigned to the same assignee as the present application. This application is hereby incorporated by reference.

FIELD OF THE INVENTION

The present invention relates to clocking data in digital systems. More specifically, the present invention relates to the determination of phase-based relationships between two clocks having the same frequency, but initially unknown phase-based relationships.

DESCRIPTION OF THE RELATED ART

In the art of digital signal processing, which of course includes the art of computing, it is common to clock data from one integrated circuit (the sending IC) to another IC (the receiving IC) using a clock signal generated externally from both ICs. Often the sending IC will also produce a strobe signal that is delayed by ¼ of a cycle from the internal clock of the sending IC so that the data transmitted by the sending IC can be validated at the receiving IC. While the data from the sending IC is easily captured at the receiving IC using the strobe signal produced by the sending IC, the receiving IC must then shift the data from the clock domain of the sending IC to its own clock domain to continue processing the data. While the clocks within the sending and receiving ICs are the same frequency, the phase relationship between the clocks is initially unknown because of clock skew, the ¼ cycle delay, and other factors.

One prior art method of shifting data from one clock domain to another is to sequentially clock data from the sending IC into a series of flip flops using a round robin scheme, and holding each data bit at a flip flop for a longer period of time. For example, consider a strobe signal from the sending IC that indicates valid data on both the rising and falling edges (which will generically be referred to as validation edges), and a single data input pad coupled to four flip flops. Each flip flop is clocked by a signal running at ¼ the frequency of the validation edges of the strobe signal from the sending IC, and the clock of each flip flop is delayed by one validation edge with respect the flip flop logically adjacent to it. In such an arrangement, the first, fifth, and ninth bits will be received at the first flip flop, the second, sixth, and tenth bits will be received at the second flip flop, and so on. Since each bit is held within each flip flop for four validation edges, it is easier to select one of the clock edges of the receiving IC's clock to validate the incoming data bit and transfer the data bit from the sending IC's clock domain to the clock domain of the receiving IC.

While using such a round robin scheme eases the problem of transferring the data bit from the sending IC's clock domain to the clock domain of the receiving IC, the receiving IC must still have some method of determining which flip flop to read data from for any given clock cycle. In the example above, for a given validation edge of the receiving ICs clock, the data is typically more centered and best validated at one of two possible flip flops. Accordingly, a select signal is required to determine which flip flop to read for any given validation edge of the clock of the receiving IC.

In the prior art, this select signal was typically selected using a master IC. The master IC contained a series of registers that stored the proper orientation of select signals for the ICs on the board. A designer would design the logic circuit, and when the design was nearing conclusion, would perform timing simulations for the complete system. Based on the timing simulations, the proper values would be loaded into the registers of the master IC to provide the proper select signal orientation to the other ICs. If it turned out that the simulations were not accurate, or subsequent modifications were made to the board which altered clock skew, the select signal orientations could easily be changed by reloading the registers of the master IC.

While the master IC works well, programming it requires extra simulation steps and subsequent debugging. In addition, using a master IC can consume many I/O pins. Note that a select signal is required for each strobe signal provided by another IC. Therefore, if an IC is designed to receive strobe signals from twelve other ICs, twelve I/O pins are required. Unfortunately, in the art of integrated circuit design increases in transistor density are not matched by corresponding increases in I/O pin density. It is becoming increasing difficult to dedicate so many I/O pins to select signals.

A solution to this problem was disclosed by Paul L. Rogers in co-pending U.S. application Ser. No. 09/365,055, which was filed on Jul. 30, 1999, is entitled "A Method and Apparatus for Automatically Determining the Phase Relationship Between Two Clocks Generated from the Same Source", is assigned to the same assignee as the present application, and is incorporated by reference above. This application discloses a phase detection circuit that compares the initial phase of the select signal in the clock domain of the receiving IC with one of the round robin clock signals in the clock domain of the sending IC. If the phase detection circuit determines that the phase of the select signal has the proper orientation, then the phase detect circuit does not toggle the orientation of the select signal. However, if the phase detection circuit determines that the select signal has an incorrect orientation, then the select signal is delayed for ½ of a cycle of the select signal, thereby establishing the proper orientation of the select signal. Thereafter, the orientation of the select signal remains locked until the system is reset or powered down.

In the scheme disclosed by Rogers, the initial timing of the select signal may be quite close to the point at which the phase detection circuit decides whether to toggle the select signal. As a matter of fact, the system may power-up and toggle the orientation of the select signal one time, and not toggle the orientation the next time the system is powered up. However, this does not cause any problems because when the select signal is locked it will cause the data bit to be read either ¼ or ¾ of the way into the read window. Accordingly, in this situation either orientation of the select signal will produce a valid read.

While the scheme disclosed by Rogers works well, the potential asynchronous nature of the initial determination of the orientation of the select signal may cause difficulties when debugging the system. As is known in the art, it is much easier to debug a repeatable problem than it is to debug an intermittent problem. Assume that a system has a hardware bug that only appears with one orientation of the select signal, but not the other. Further assume that the orientation that produces the bug is only selected by the phase detection circuit 1 out of 1000 times the system is powered up. Such a bug will be very hard to isolate.

SUMMARY OF THE INVENTION

The present invention provides a method and apparatus for forcing synchronous operation in a system that automatically determining a phase-based relationship between two clocks. In accordance with the present invention, a transmitting IC includes a selectable delay capable of delaying data and strobe signals by either one validation edge of the strobe signal, or three validation edges of the strobe signal, or not delaying the data and strobe signals. The sending IC transmits data to a receiving IC over a data bus, and provides the strobe signal, which is delayed by ¼ of a cycle of the internal clock of the sending IC, to validate data at the receiving IC. Because of clock skew, the ¼ cycle delay, and other factors, the phase relationship between the strobe signal and the internal clock of receiving IC is initially unknown.

Within the receiving IC, the strobe signal is used to form four round robin clock signals. Each of the four round robin clock signals has a falling edge once every two cycles of the strobe signal. However, each of the four round robin clock signals is offset from the round robin clock signal logically adjacent to it by ½ of a cycle of the strobe signal. The round robin clock signals are used to clock data into four flip flops using a round robin scheme. For example, if the first flip flop captures the first, fifth, and ninth bits, the second flip flop will capture the second, sixth, and tenth bits, the third flip flop will capture the third, seventh, and eleventh bits, and the fourth flip flop will capture the fourth, eighth, and twelfth bits.

Each of the round robin flip flops has a valid read window. A pair of multiplexors route the outputs of the round robin flip flops to a pair of flip flops that are clocked using internal clocks of the receiving IC, thereby transferring the incoming data from the clock domain of the sending IC to the clock domain of the receiving IC.

A select signal in the clock domain of the receiving IC is provided to the pair of multiplexors. The select signal can have one of two possible orientations. If the orientation is correct, each round robin flip flop will be read at least ¼ and no more than ¾ of the way into the read window of that flip flop, thereby resulting in a valid read. However, if the orientation signal is incorrect, a read error may occur, resulting in data corruption.

To ensure that the select signal has the proper orientation, a phase detection circuit compares the phase of the select signal in the clock domain of the receiving IC with one of the round robin clock signals in the clock domain of the sending IC. The phase detection circuit begins detecting the phase relationship after a power-on reset signal is deasserted. The power-on reset signal is asserted when a computer is powered on, and is deasserted a sufficient time after the power supplies have reached stable voltage levels.

If the phase detection circuit determines that the phase of the select signal has the proper orientation with respect to the phase of the round robin clock signal, then the phase detect circuit does not toggle the orientation of the select signal. However, if the phase detection circuit determines that the select signal has an incorrect orientation, then the select signal is delayed for ½ of a cycle of the select signal, thereby establishing the proper orientation of the select signal.

At some point after the deassertion of the power-on reset signal, a system reset signal is deasserted. When the system reset signal is deasserted, the phase detection circuit locks in the orientation of the select signal, thereby preventing later disruption of the round robin scheme, which would occur if the orientation were later toggled.

The initial timing of the select signal may be quite close to the point at which the phase detection circuit decides whether to toggle the select signal. As a matter of fact, the system may power-up and toggle the orientation of the select signal one time, and not toggle the orientation the next time the system is powered up. However, this does not cause any problems because when the select signal is locked it will cause the data bit to be read either ¼ or ¾ of the way into the read window. Accordingly, in this situation either orientation of the select signal will produce a valid read.

The potential asynchronous nature of the initial determination of the orientation of the select signal may cause difficulties when debugging the system. As is known in the art, it is much easier to debug a repeatable problem than it is to debug an intermittent problem. Assume that a system has a hardware bug that only appears with one orientation of the select signal, but not the other. Further assume that the orientation that produces the bug is only selected by the phase detection circuit 1 out of 1000 times the system is powered up. Such a bug will be very hard to isolate.

The present invention solves this problem by providing a selectable delay capable of delaying data and strobe signals by either ¼ of a cycle of the strobe signal, or ¾ of a cycle of the strobe signal, or not delaying the data and strobe signals. If it is determined that the initial timing of the select signal is close to the point at which the phase detection circuit decides whether to toggle the select signal, and it is suspected that an intermittent hardware bug can be made repeatable by forcing a particular orientation of the select signal, the data and strobe signals can be delayed to force either orientation. Accordingly, the selection of the orientation of the select signal becomes asynchronous and an intermittent bug may become a repeatable bug. As is known in the art, it is much easier to isolate and debug a repeatable hardware bug than an intermittent hardware bug.

DETAILED DESCRIPTION OF THE PREFERRED EMBODIMENTS

The present invention is a method and apparatus for delaying clock and data signals to force synchronous operation in a digital system that automatically determines the phase relationship between two clocks having a related frequency but initially unknown phase relationship. Such a digital system was disclosed by Paul L. Rogers in co-pending U.S. application Ser. No. 09/365,055, which was filed on Jul. 30, 1999, is entitled "A Method and Apparatus for Automatically Determining the Phase Relationship Between Two Clocks Generated from the Same Source", is assigned to the same assignee as the present application, and is incorporated by reference above. By forcing synchronous operation of an otherwise asynchronous digital system, it is possible to cause intermittent hardware bugs to become repeatable, thereby simplifying the process of isolating and resolving hardware bugs. While the present invention will be described with reference to the system disclosed by Rogers, those skilled in the art will recognize that the present invention may be employed in similar configurations.

Figure 1:
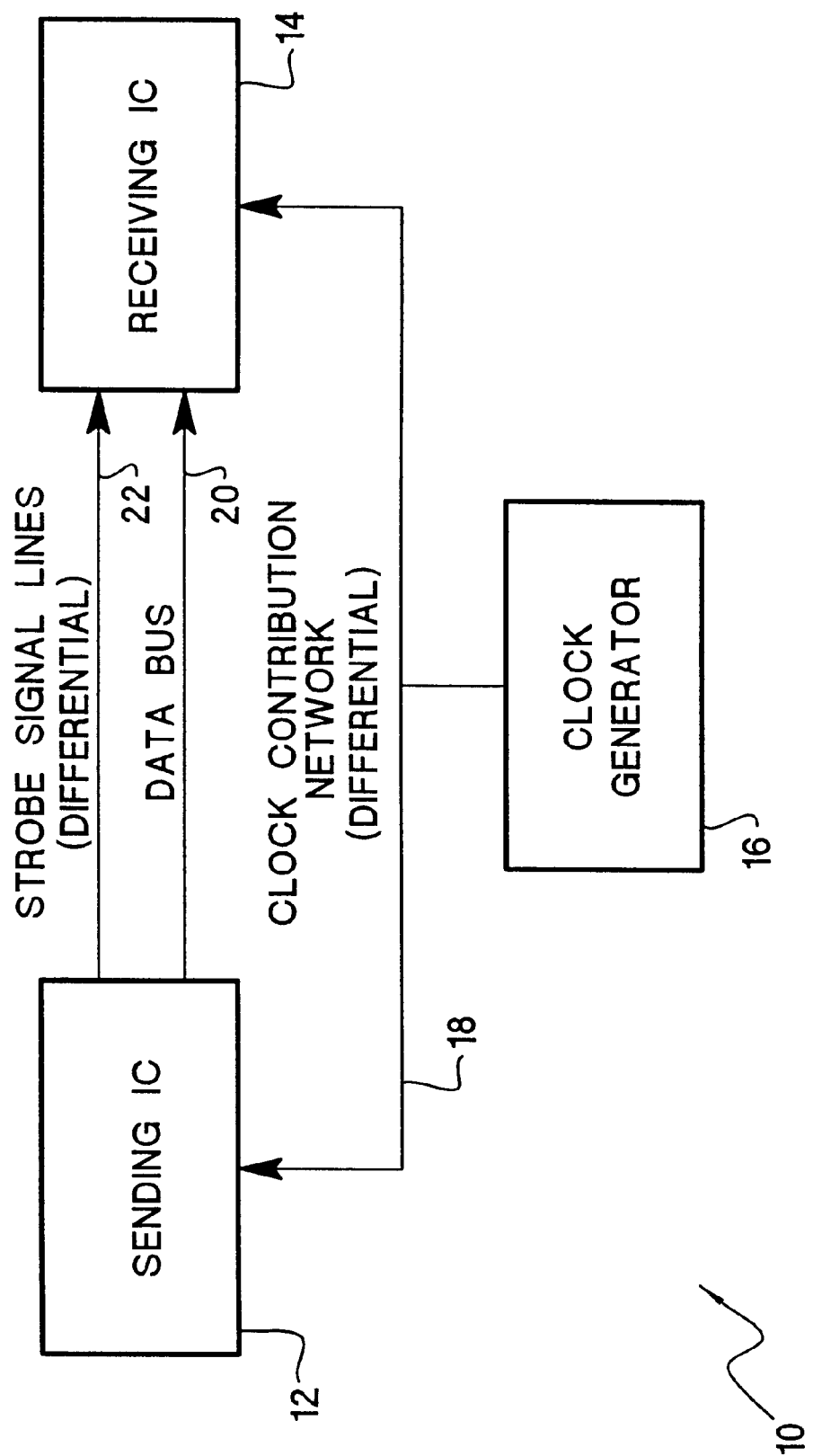
FIG. 1 is a block diagram of a digital system that will be used to describe the present invention.

FIG. 1 is a block diagram of system 10, which will be used to describe the present invention. Obviously an actual digital system would be much more complex. However, system 10 is more than adequate to facilitate an understanding of the present invention.

System 10 includes a sending integrated circuit (IC) 12, a receiving IC 14, and a clock generator 16. Clock generator 16 provides a differential clock signal to ICs 12 and 14 via clock distribution network 18.

Sending IC 12 transmits data to receiving IC 14 via data bus 20. As is known in the art, data busses typically carry a plurality of data signals simultaneously on a plurality of bus conductors. However, to simplify the presentation of the present invention below only a single conductor of data bus 20 will be discussed. In order to validate at receiving IC 14 the data carried by data bus 20, sending IC 12 also provides a differential strobe signal on strobe signal lines 22 that is delayed by ¼ of a cycle of the internal clock of sending IC 12.

As discussed above in the section entitled "Description of the Related Art", the internal clock of receiving IC 14 will have the same frequency as, but an initially unknown phase relationship with respect to, the clock carried on strobe signal lines 22. Accordingly, receiving IC 14 must shift the incoming data from the clock domain of the differential clock carried by strobe signal lines 22 to the clock domain of receiving IC 14. This is done by sequentially clocking received data from sending IC 12 into a series of flip flops of receiving IC 14 using a round robin scheme, and holding each data bit at a flip flop for a longer period of time.

Figure 2:
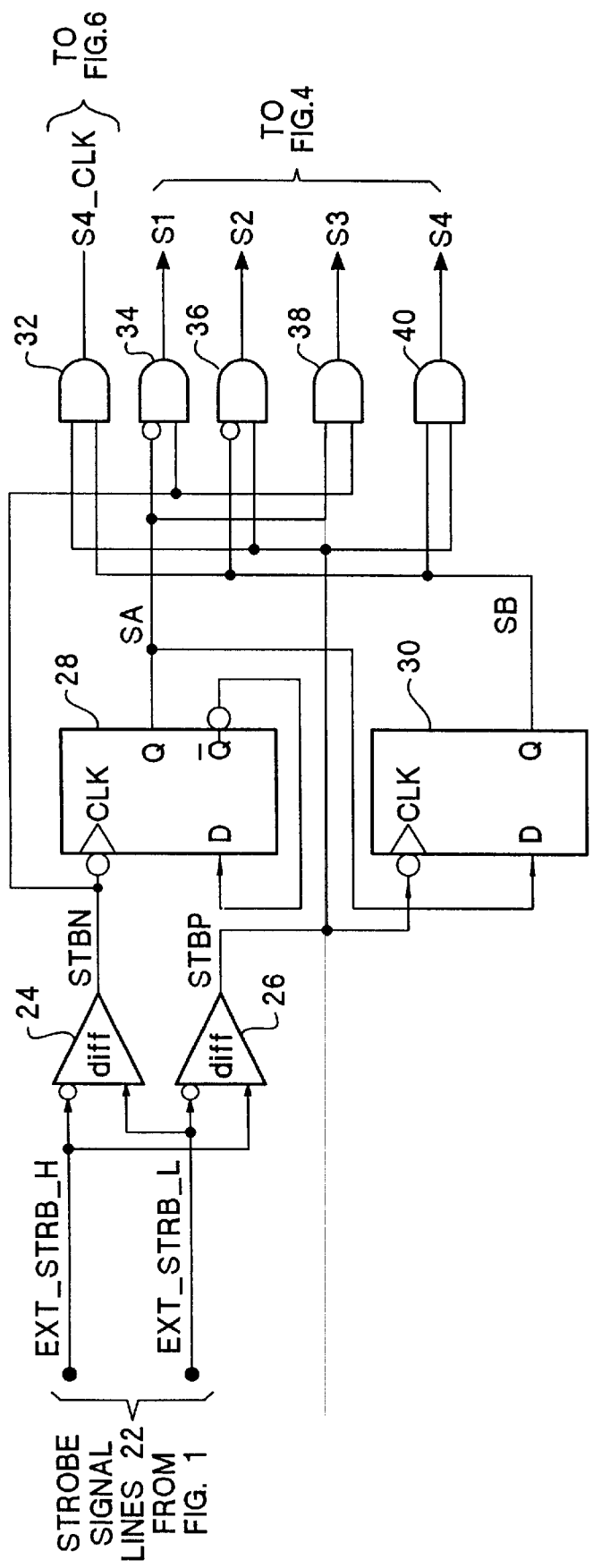
FIG. 2 is a block diagram of a portion of a receiving integrated circuit (IC) shown in FIG. 1 that generates four flip flop clock signals based on a differential signal carried by strobe signal lines that are provided by a sending IC shown in FIG. 1.

FIG. 2 is a block diagram of the portion of IC 14 that generates four flip flop clock signals based on the signal carried by strobe signal lines 22 of FIG. 1. The portion of IC 14 shown in FIG. 2 includes differential receivers 24 and 26, flip flops 28 and 30, and AND gates 32, 34, 36, 38, and 40. As will be discussed in greater detail below, it may be desirable to use more flip flops in the round robin scheme, in which case additional flip flop clock signals would be required.

Figure 3:
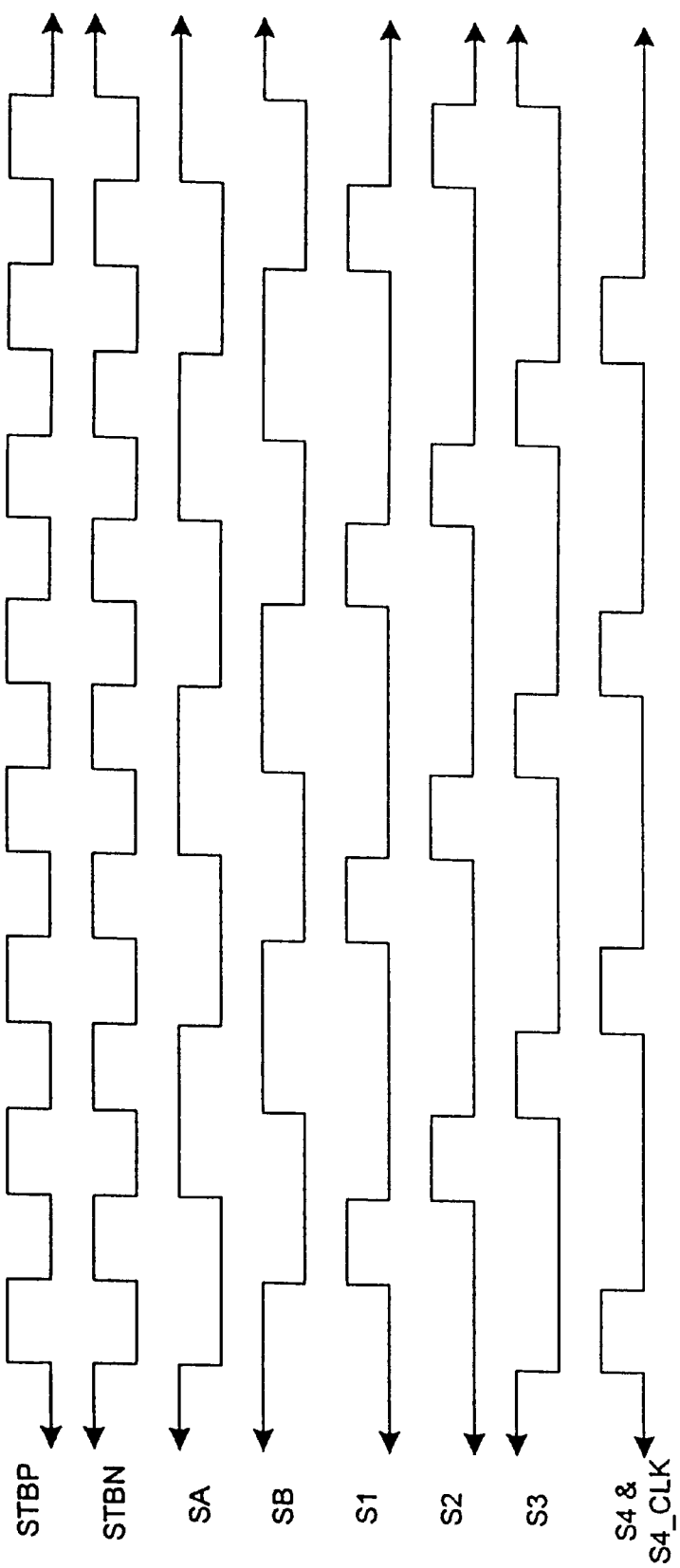
FIG. 3 is a timing diagram that shows timing relationships between some of the signals present in the circuit shown in FIG. 2.

The signals EXT_STRB_H and EXT_STRB_L are received from strobe signal lines 22 of FIG. 1, and are provided to differential receivers 24 and 28 to produce differential signals STBN and STBP. Signals STBN and STBP are shown in FIG. 3. Flip flop 28 is configured to receive the signal STBN at its CK input and produce an intermediate signal SA, which is the signal STBN divided by two. Intermediate signal SA is shown in FIG. 3. Signal SA is provided to the D input of flip flop 30, which is clocked at its CK input by the signal STBP, thereby producing intermediate signal SB. Intermediate signal SB is shown in FIG. 3, and is a copy of the signal SA delayed by one validation cycle of the signals STBP and STBN. Note that as used herein, the term "validation cycle" refers to the period between validation edges. Accordingly, in the signals STBP and STBN, a validation cycle occurs every rising and falling edge. In contrast, the term "cycle" used along will refer to the period between repeating parts of the waveform. Accordingly, each "cycle" of the signals STBP and STBN contains two "validation cycles".

AND gates 32, 34, 36, 38, and 40 gate together various combinations of the signals STBP, STBN, SA, and SB to form clock signals S1, S2, S3, S4, and S4_CLK. Note that clock signals S4 and S4_CLK are the same logical signal. Signals S1, S2, S3, and S4 (and S4_CLK) are shown in FIG. 3. Note that each of the four clock signals has a falling edge once every two cycles (or once every four validation cycles) of the signals STBP and STBN. However, each of the four clock signals is offset from the clock signal logically adjacent to it by one validation cycle of the signals STBP and STBN. Accordingly, clock signals S1, S2, S3, and S4 are used to clock the flip flops that are part of the round robin scheme described above. These four flip flops are shown in FIG. 4.

Figure 4:
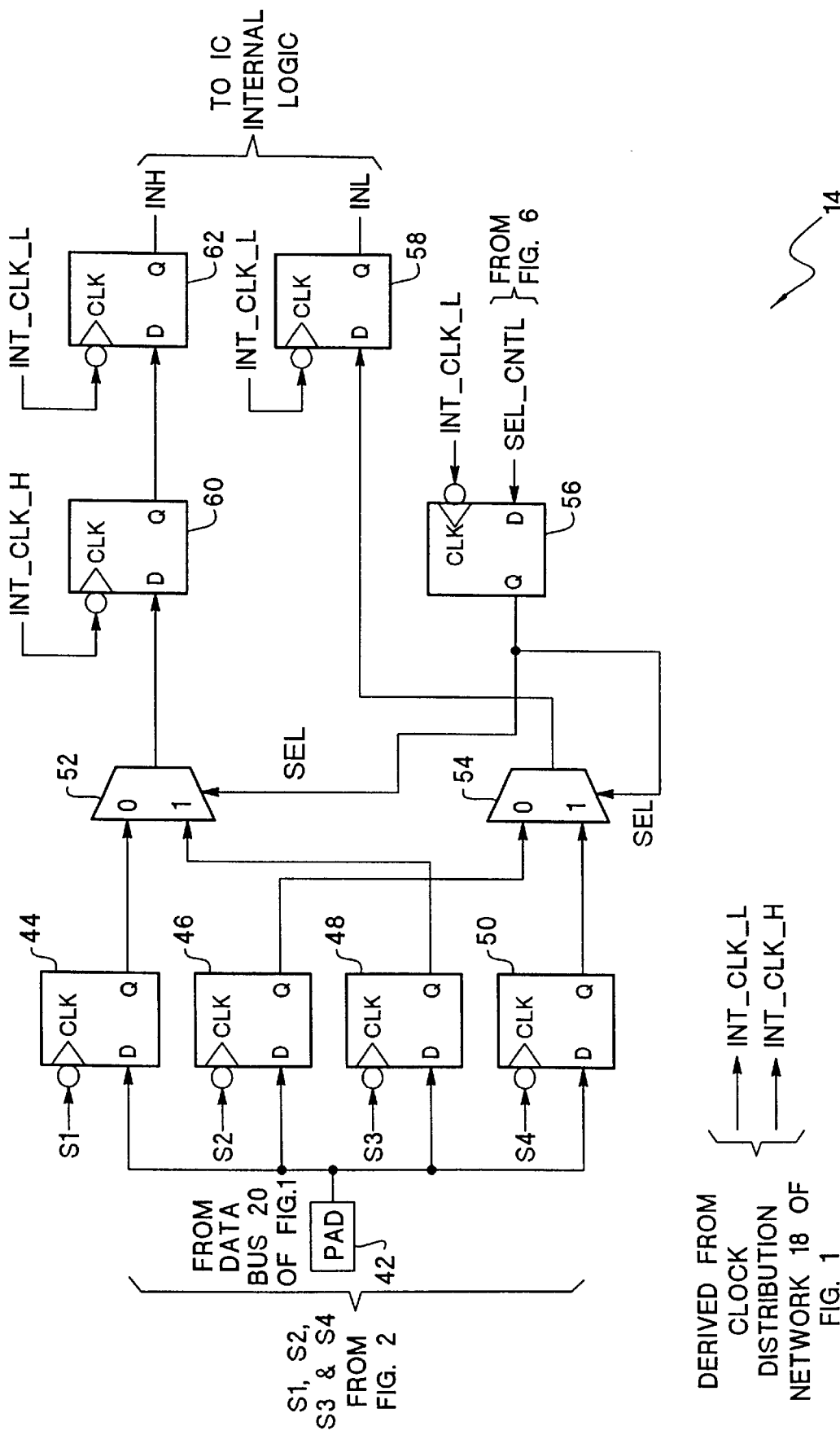
FIG. 4 is a block diagram showing a portion of the receiving IC that transfers received data from the clock domain of a sending IC to the clock domain of the receiving IC.

FIG. 4 is a block diagram showing the portion of IC 14 that transfers received data from the clock domain of sending IC 12 to the clock domain of receiving IC 14. The portion of IC 14 shown in FIG. 4 includes pad 42, flip flops 44, 46, 48, 50, 56, 58, 60, and 62, and multiplexors 52 and 54. Note that the internal clock signals INT_CLK_L and INT_CLK_H are derived from clock distribution network 18 of FIG. 1. Accordingly, the signals INT_CLK_L and INT_CLK_H have the same frequency as, but an initially unknown phase relationship with respect to, the signals STBN and STBP.

One conductor of data bus 20 of FIG. 1 is coupled to pad 42, and pad 42 is coupled to the D inputs of flip flops 44, 46, 48, and 50. The CK input of flip flop 44 is connected to signal S1, the CK input of flip flop 46 is connected to signal S2, the CK input of flip flop 48 is connected to signal S3, and the CK input of flip flop 50 is connected to signal S4. Accordingly, each flip flop captures every fourth bit arriving at pad 42. For example, if flip flop 44 captures the first, fifth, and ninth bits, flip flop 46 will capture the second, sixth, and tenth bits, flip flop 48 will capture the third, seventh, and eleventh bits, and flip flop 50 will capture the fourth, eighth, and twelfth bits.

As will be seen below with reference to FIG. 5, the falling edge of clock INT_CLK_H will line up with a valid read window of either flip flop 44 or 48. Likewise, the falling edge of clock INT_CLK_L will line up with a valid read window of either flip flop 46 or 48. The signal SEL determines which flip flops to read, and is provided to multiplexors 52 and 54. Note that the signal SEL is derived from the signal SEL_CNTL from FIG. 6 by synchronizing SEL_CNTL with the signal INT_CLK_L at flip flop 50. The signal SEL_CNTL will be discussed below with reference to FIG. 6.

Every falling edge of the signal INT_CLK_L, flip flop 58 reads the output of multiplexor 54 to form the signal INL. Likewise, every falling edge of the signal INT_CLK_H, flip flop 60 reads the output of multiplexor 52, and flip flop 62 synchronizes the output of flip flop 60 with the falling edge of INT_CLK_L to form the signal INL. Accordingly, at every falling edge of INT_CLK_L, two bits are available at signals INH and INL. These signals represent data bits that have been transferred from the clock domain of sending IC 12 at pad 42 to the clock domain of receiving IC 14. These signals are provided to internal logic of IC 14 for further processing, and are not relevant to the continued discussion of the present invention.

Note that in FIGS. 2 and 4, individual clock signals are generated for each of the round robin flip flops. However, often it is easier to design, verify, and layout a circuit wherein all flip flops are driven by the same clock signal. Accordingly, in an alternative configuration it is possible to clock all the round robin flip flops using the system clock, and to successively enable the round robin flip flops using staggered enable signals to provide the same functionality shown in FIGS. 2 and 4. The term "activation signal" may be used to generically refer to either a round robin clock signal or a round robin enable signal.

Figure 5:
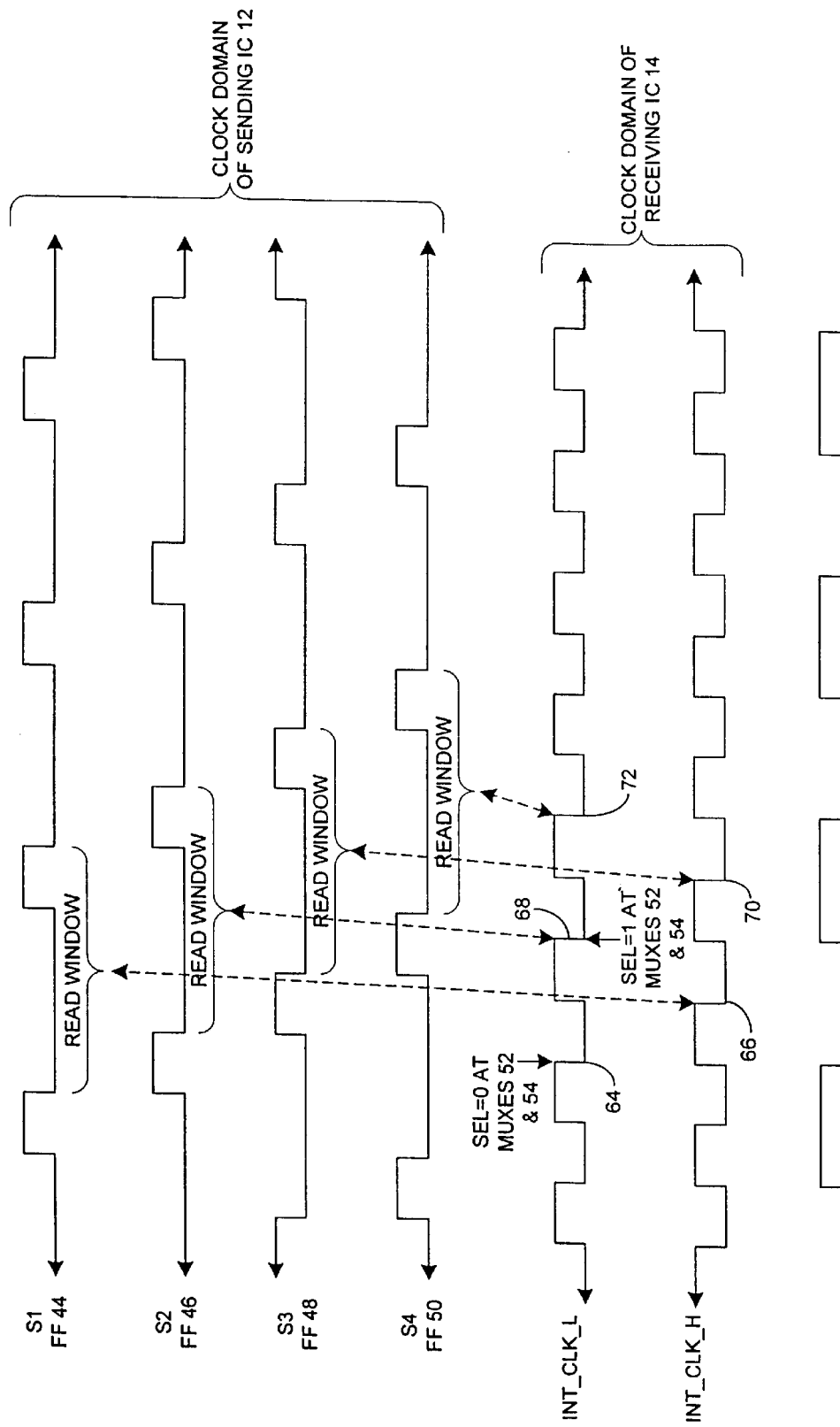
FIG. 5 is a timing diagram that shows timing relationships between some of the signals present in the circuit shown in FIG. 4.

FIG. 5 shows several timing diagrams that illustrate the operation of the portion of IC 14 shown in FIG. 4. Clock signals S1, S2, S3, and S4, which are provided to flip flops 44, 46, 48, and 50, respectively, are in the clock domain of sending IC 12. Clock signals INT_CLK_L and INT_CLK_H are in the clock domain of receiving IC 14. As mentioned above, the phase relationship between the two clock domains is not initially known.

A valid read window is shown for each of the flip flops. To properly transfer the incoming data from the clock domain of sending IC 12 to the clock domain of receiving IC 14, it is desirable to read the data from the flip flops near the centers of the read windows. To see how this is done, assume that the SEL signal from flip flop 56 becomes "0" at edge 64 of signal INT_CLK_L. Thereafter, flip flop 60 will read data from multiplexor 52 at edge 66 of signal INT_CLK_H. Since the signal SEL is "0", the data will be provided by flip flop 44. Note that edge 66 is well centered in the read window of flip flop 44.

At edge 68 of signal INT_CLK_L, flip flop 58 will read data from multiplexor 54. Since the signal SEL is still "0", the data will be provided by flip flop 46. Note that edge 68 is well centered in the read window of flip flop 46.

The signal SEL then changes from "0" to "1" at edge 68. Thereafter, flip flop 60 will read data from multiplexor 52 at edge 70 of signal INT_CLK_H. However, since the signal SEL is now "1", the data will be provided by flip flop 48. Note that edge 70 is well centered in the read window of flip flop 48. Likewise, at edge 72 of signal INT_CLK_L, flip flop 58 will read data from multiplexor 54. Since the signal SEL is now "1", the data will be provided by flip flop 50. Note that edge 72 is well centered in the read window of flip flop 50.

As can be seen in FIG. 5, the orientation of signal SEL with respect to the clock domain of sending IC 12 (signals S1, S2, S3, and S4) is critical. In FIG. 5, if the signal SEL is inverted, then flip flop 60 would read flip flop 48 at edge 66 and read flip flop 44 at edge 70, and flip flop 58 would read flip flop 50 at edge 68 and read flip flop 46 at edge 72. Note that each of these edges is not well centered with respect to the read window of the flip flop being read. Accordingly, data read errors may occur. Therefore, it is essential to establish the proper orientation of the SEL signal with respect to the clock domain of the sending IC. In essence, the orientation of the SEL signal establishes a phase-based relationship between the clock domain of the sending IC and the clock domain of the receiving IC.

As discussed above in the section entitled "Description of the Related Art", in the prior art the orientation of the signal SEL was provided by a master IC. While the master IC worked well, programming it required extra simulation steps and subsequent debugging. The present invention eliminates the need for a master IC, and allows integrated circuits designed in accordance with the present invention to "discover" the proper orientation of the select signal.

Figure 6:
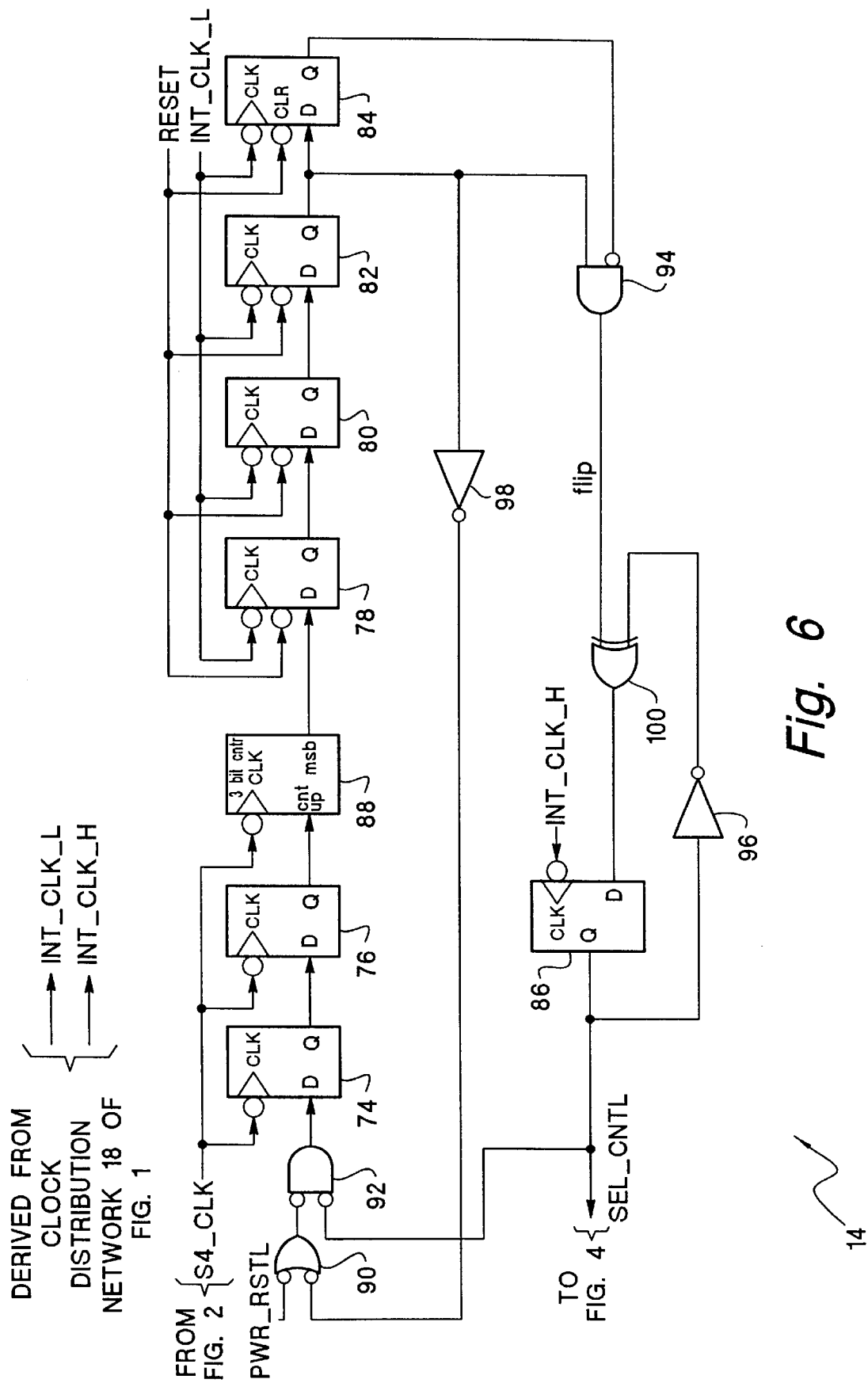
FIG. 6 is a block diagram showing a portion of the receiving IC that detects a phased-based relationship between the clock domains of the sending and receiving ICs and generates a select signal used by the circuit shown in FIG. 4.

FIG. 6 is a block diagram showing the portion of IC 14 that generates the SEL_CNTL signal suppled to flip flop 56 of FIG. 4, which in turn generates the SEL signal that is provided to multiplexors 52 and 54, as described above. The portion of IC 14 shown in FIG. 6 includes flip flops 74, 76, 78, 80, 82, 84, and 86, 3-bit up/down counter 88, OR gate 90 (which has inverting inputs), AND gate 92 (which has inverting inputs), AND gate 94 (which has an inverting input on the input connected to flip flop 84), inverters 96, and 98, and exclusive-OR gate 100.

There are two signals shown in FIG. 2 that are first presented in this Figure. The signal PWR_RSTL is a reset signal that is asserted as a "0" when the system is first powered up. After the power supplies have reached stable voltage levels and after the clock provided by clock generator 16 has been running for a sufficient period of time, the signal PWR_RSTL is deasserted and becomes "1". The other signal is the RESET signal. The RESET signal is asserted as a "1" when the system is first powered up, and remains high for a period of time after the PWR_RSTL signal is deasserted and becomes "1". After a sufficient period of time, the signal RESET is deasserted and becomes "0", and IC 14 begins "normal" operation. The RESET signal may also be asserted and deasserted at a later time to reset system 10.

The orientation of the SEL signal in FIG. 4 is determined during the period of time between the deassertion of the PWR_RSTL signal and the deassertion of the RESET signal. Once the RESET signal is deasserted, it is important that the orientation of the SEL signal not change because during so would disrupt the round robin scheme that is used to receive data from sending IC 12.

The signal FLIP from AND gate 94 will normally be "0". When the FLIP signal is "0" XOR gate 94 will act as a buffer and provide the output of inverter 96 to the D input of flip flop 86. Since the input of inverter 96 is connected to the Q output of flip flop 86, flip flop will simply function as a toggle that switches state every falling edge of the signal INT_CLK_H. The signal SEL_CNTL is produced at the Q output of flip flop 86, which in turn is used by flip flop 56 in FIG. 4 to produce the SEL signal.

As discussed above, the signal SEL can have one of two possible orientations. Accordingly, when system 10 of FIG. 1 is powered up, the signal SEL will either have the correct orientation or the incorrect orientation. If the orientation is correct, the SLIP signal will not be asserted and flip flop 86 will continue to produce the signal SEL_CNTL. However, if the orientation is incorrect, the signal FLIP will be asserted during one single falling edge of the signal INT_CLK_H. This will cause XOR gate 100 to act as an inverter for one cycle, which in combination with inverter 86 will effect a passthrough from output Q of flip flop 86 to input D of flip flop 86 for one cycle. Accordingly, the signal SEL_CNTL will shift one cycle resulting in the correct orientation of the SEL signal.

The circuit shown in FIG. 6 determines whether to toggle the orientation of the SEL signal by comparing the signal S4_CLK from FIG. 2 with the signal SEL_CNTL. The circuit will be described in detail below with respect to two situations. In one situation, it will be clear that the orientation must be toggled. In the other orientation, it will clear that the orientation is correct.

However, before considering how these two situation, first consider what happens when the falling edge of the signal S4_CLK is aligned with the falling edge of the signal INT_CLK_H. This situation defines the threshold point at which the decision to either toggle or not toggle the orientation of the SEL signal is made. While the circuit includes 3-bit counter 88 to integrate out jitter (which will be described in greater detail below), for now assume that when the falling edge of the signal S4_CLK is aligned with the falling edge of the signal INT_CLK_H the circuit may select either orientation. And as will be seen shortly, in this situation it does not matter which orientation is selected.

Figure 7:
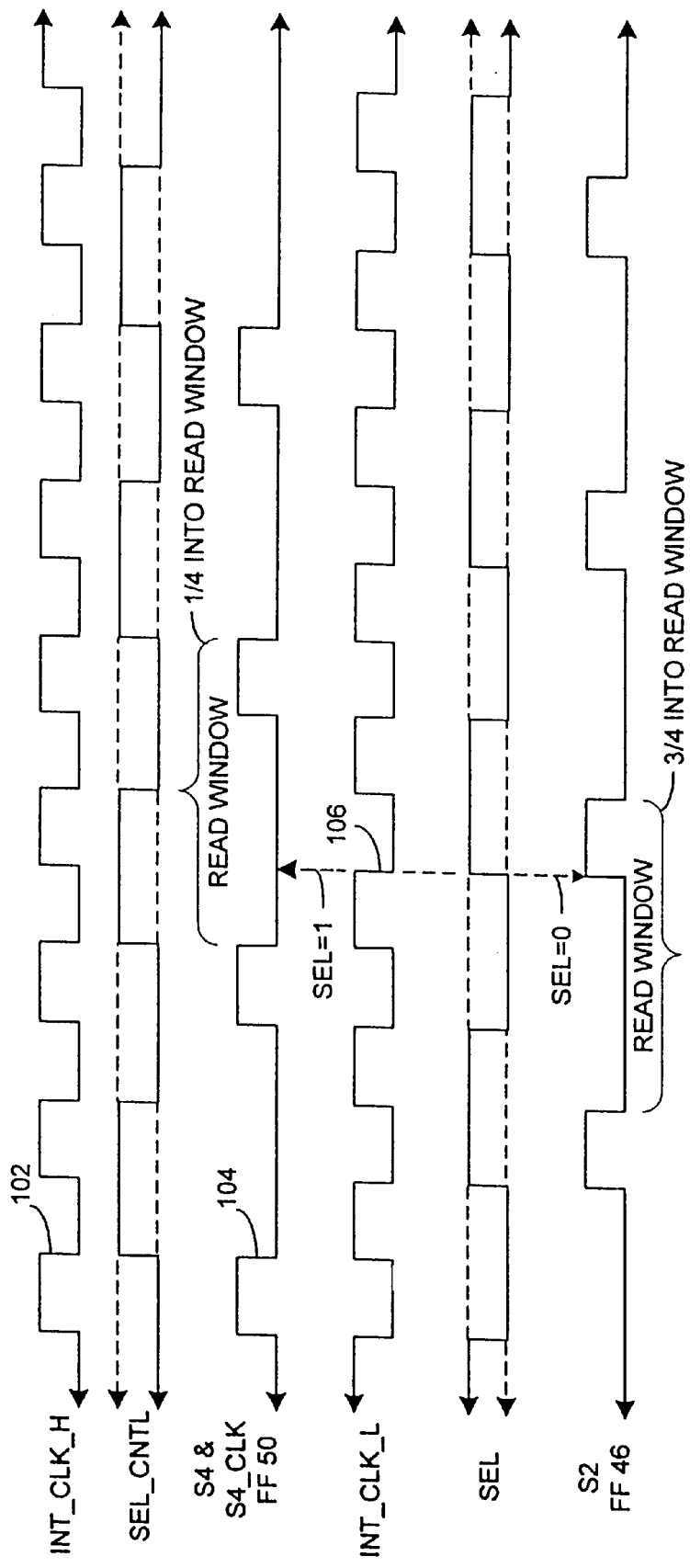
FIG. 7 is a timing diagram that shows timing relationships between some of the signals present in the circuits of FIGS. 2, 4, and 6 when a falling edge of a particular signal in the clock domain of the sending IC is aligned with a falling edge of a particular signal in the clock domain of the receiving IC.

FIG. 7 is a timing diagram that illustrates how the circuits in FIGS. 2, 4, and 6 function when the falling edge of the signal S4_CLK is aligned with the falling edge of the signal INT_CLK_H. Note that falling edge 102 of signal INT_CLK_H is aligned with falling edge 104 of signal S4_CLK. Accordingly, the signal SEL_CNTL will assume one of the two possible orientations. In FIG. 7, one orientation is shown with a solid line, while the other orientation superimposed as a dotted line. The signal SEL_CNTL is synchronized with the falling edge of the signal INT_CLK_H. In FIG. 4, the signal SEL_CNTL is provided to flip flop 56 which is clocked by the signal INT_CLK_L and produces the signal SEL. Accordingly, the signal SEL is a copy of the signal SEL_CNTL, but delayed by ½ of a cycle of the signals INT_CLK_H or INT_CLK_L. The signal SEL is shown in FIG. 7, with one orientation shown as a solid line and the other orientation superimposed as a dotted line.

Now assume that flip flop 58 is reading a data bit at falling edge 106 of signal INT_CLK_L. The signal SEL will have one of the two possible orientations, and therefore will either be "0" or "1". If SEL="1", then multiplexor 54 will select flip flop 50 to provide the data bit. The read window of flip flop 50 is shown in FIG. 7. Note that flip flop 58 will read the data bit from flip flop 50 ¼ of the way into the read window of flip flop 50. Now assume that the signal SEL has the other orientation and is "0". Multiplexor 54 will select flip flop 46 to provide the data bit. The read window of flip flop 46 is shown in FIG. 7. Note that flip flop 58 will read the data bit from flip flop 46 ¾ of the way into the read window of flip flop 46.

FIG. 7 illustrates the worst case situation. The data bit will be read either ¼ or ¾ of the way into the read window. However, this is still a very stable read because ¼ of the read window is equal to ½ of a cycle of the signals INT_CLK_L and INT_CLK_H. Any other alignment of the falling edge of signal S4_CLK and the falling edge of signal INT_CLK_H will move the read point more toward the center of the read window. Accordingly, the present invention will always read flip flops 44, 46, 48, and 50 at least ¼ and no more than ¾ of the way into the read windows of the flip flops. Note that this window can be narrowed even further by using more flip flops in the round robin scheme. In FIG. 4, four flip flops are used. However, if, for example, six round robin flip flops where used, the round robin flip flops would be read at least ⅓ and no more than ⅔ of the way into the read window. The present invention may be employed with any number of round robin flip flops. Also, it may be desirable to select a read point that is skewed toward one side of the read window to ensure that set-up and hold times are adequate. One skilled in the art will understand how to adapt the teachings herein to set the valid read windows based on the number of flip flops in the round robin scheme and the desired set-up and hold times.

Now assume that the circuit shown in FIG. 6 must toggle the orientation of the select signal. First, consider what happens when system 10 is first powered up. The clocks are running, the signal PWR_RSTL is "0", and the signal RESET is "1". While PWR_RSTL is "0", the output of OR gate 90 will be "1" and the output of AND gate 92 will be "0". Accordingly, a "0" will propagate through flip flops 74 and 76, and 3-bit counter 88 will count down to "000". Eventually the most significant bit (MSB) of counter 88 will become "0" and this value will propagate through flip flops 78, 80, 82, and 84. At this point, the signal FLIP will be "0".

Now assume that system 10 has been powered up for a sufficient period and the signal PWR_RSTL is deasserted and becomes "1". At this point, the output of flip flop 82 is "0", the output of inverter 98 is "1" and the output of OR gate 90 "0". Accordingly, AND gate 92 will invert the signal SEL_CNTL and the result will be clocked into flip flop 74 at the falling edge of the signal S4_CLK. If signal SEL_CNTL is "1" when this happens, the orientation of signal SEL is correct and does not need to be toggled. However, assume that SEL_CNTL is "0" and the orientation of SEL needs to be toggled. The output of AND gate 92 will be "1", and this value will be clocked into flip flop 74 at the falling edge of the signal S4_CLK.

Since SEL_CNTL and S4_CLK are phase independent, the possibility of metastable behavior exists if the falling edge of the signal S4_CLK is close to the falling edge of the signal INT_CLK_H. Flip flop 76 solves this problem. Accordingly, a "1" gets clocked into flip flop 76 at the next falling edge of the signal S4_CLK and is presented to the CNT UP input of 3-bit counter 88.

The purpose of 3-bit counter 88 is to integrate out any jitter in the signal if the falling edge of the signal S4_CLK is close to the falling edge of the signal INT_CLK_H. In the discussion of FIG. 7 above, it was shown that the orientation of the SEL signal does not matter if the falling edge of the signal S4_CLK is aligned with the falling edge of the signal INT_CLK_H. However, assume that the edges are close and 10% of the time the incorrect orientation is detected at flip flop 74. It would still be desirable for the circuit to determine that the orientation is correct. Counter 88 addresses this problem by requiring a net sum of four incorrect detections before toggling the orientation. Accordingly, after the CNT UP input of counter 88 has been "1" at the falling edge of S4_CLK a net sum of four times, the MSB output of counter 88 becomes "1".

Because S4_CLK and INT_CLK_L are phase independent, flip flops 78 and 80 are provided to eliminate the possibility of metastable behavior. Therefore, after the MSB output of counter 88 becomes "1", this value will propagate through flip flops 78 and 80. Note that at this point, the RESET signal is "1", so the CLEAR inputs of flip flops 78, 80, 82, and 84 are not asserted.

When the value "1" propagates from flip flop 80 to flip flop 82, the output of inverter 98 will become "0". At this point, the flip flops "upstream" from flip flop 82 and counter 88 are most likely each providing a "1" at their outputs. While these values propagate through to flip flop 82, inverter 98 generates a "0" that quiesce the phase detection circuit by blocking the SEL_CNTL signal at AND gate 92 until after the orientation has been toggled, and counter 88 begins counting down toward "000".

When the first "1" propagates into flip flop 82, for one cycle of the signal INT_CLK_L the output of flip flop 82 will be "1" and the output of flip flop 84 will be "0". The outputs of flip flops 82 and 84 are presented to AND gate 94, which also first inverts the output of flip flop 84. Accordingly, the signal FLIP is asserted for one cycle of the signal INT_CLK_L at the output of AND gate 94.

When the signal FLIP is asserted, XOR gate 100 becomes an inverter for one cycle. XOR gate 100 in combination with inverter 96 effects a passthrough from the Q output to the D input of flip flop 86 for one cycle. Accordingly, the orientation of the signal SEL_CNTL (as well as the orientation of the signal SEL in FIG. 4) will be toggled. Now the signal SEL_CNTL will be "1" at the falling edge of S4_CLK.

Since the signal FLIP is only asserted when the output of flip flop 82 is "1" and the output of flip flop 84 is "0", FLIP will not be asserted as the remainder of "1" values propagate through flip flop 84. Nor will FLIP be asserted when "0" propagate through flip flops 82 and 84.

When a "0" propagates to flip flop 82, signal SEL_CNTL will no longer be blocked at AND gate 92 by the output of inverter 98 flowing through OR gate 90. However, the signal SEL_CNTL will now be "1" at the falling edge of S4_CLK, so values of "0" will continue to propagate through flip flops 74, 76, 78, 80, 82, and 84 and counter 88. Accordingly, the circuit has toggled the orientation of the signal SEL to select the proper read windows as illustrated in FIGS. 5 and 7.

In view of the discussion above, where the orientation of the signal SEL is toggled, the discussion of the situation where SEL has the proper orientation is trivial. When the signal PWR_RSTL is deasserted and becomes "1", values of "0" have propagated through flip flops 74, 76, 78, 80, 82, and 84 and counter 88, as described above. Since SEL has the proper orientation, the signal SEL_CNTL will be "1" at the falling edge of S4_CLK, so values of "0" will continue to propagate through flip flops 74, 76, 78, 80, 82, and 84 and counter 88. Accordingly, the signal FLIP will never be asserted and the orientation will not be toggled.

Note that as system 10 warms up and stabilizes, it is possible (though unlikely) that the orientation of the SEL signal may change several times before the RESET signal is deasserted. However, once RESET is deasserted, it is essential that the orientation not change to prevent the round robin scheme from being disrupted. This is ensured by routing the RESET signal to the CLR inputs of flip flops 78, 80, 82, and 84. Once the RESET signal is deasserted and becomes "0", the output of flip flops 78, 80, 82, and 84 will always be "0". However, if flip flop 82 contains a "1" and flip flop 84 contains a "0" when RESET is deasserted, one final toggle of the orientation will be processed properly. Also note that if the RESET signal is later asserted and deasserted to "warm-boot" system 10, the circuit shown in FIG. 6 will again validate, and if required, toggle the orientation of the SEL signal.

A typical IC may communicate with several other ICs using a plurality of data busses and strobe signal lines. The phase detection and clock generation circuitry shown in FIGS. 2 and 4 must be provided for each differential strobe signal line. Similarly, the circuitry shown in FIG. 4, which reads data bits from an IC pad, must be provided for each conductor of a data bus that arrives at an IC pad.

In the discussion above, it is shown how a digital system as disclosed by Rogers provides a simple and automatic way of determining a phase-based relationship between a strobe signal provided by a sending IC and the internal clock of a receiving IC, thereby facilitating the transfer of data from the clock domain of the sending IC to the clock domain of the receiving IC. By eliminating the master IC, the component count is reduced, I/O pin count is reduced (or I/O pins become available for other functions), circuit board trace routing is simplified, simulation steps required during design can be eliminated, and system debugging is simplified, thereby decreasing time to market and reducing cost.

However, one problem with the scheme disclosed by Rogers is that the initial orientation of the select signal may be quite close to the point at which the phase detection circuit decides whether to toggle the select signal, as is shown in FIG. 7. Accordingly, the system may power-up and toggle the orientation of the select signal one time, and not toggle the orientation the next time the system is powered up. However, this does not cause any problems because when the select signal is locked it will cause the data bit to be read either ¼ or ¾ of the way into the read window. Accordingly, either orientation of the select signal will produce a valid read.

While the scheme disclosed by Rogers works well, the potential asynchronous nature of the initial determination of the orientation of the select signal may cause difficulties when debugging the system. Although either orientation is valid, each orientation produces different latencies that may create large "ripple" effects that propagate throughout the system. As is known in the art, it is much easier to debug a repeatable problem than it is to debug an intermittent problem. Assume that a system has a hardware bug that only appears with one orientation of the select signal, but not the other. Further assume that the orientation that produces the bug is only selected by the phase detection circuit 1 out of 1000 times the system is powered up. Such a bug will be very hard to isolate.

Of course, in the final design of a computer system it is very desirable to allow the orientation of the select signal to be selected automatically, as discussed above. By doing so, the computer system can automatically compensate for variations in temperature, power supply voltages, delays which vary slightly with age, and differences in field replaceable units. However, when debugging a hardware error it is desirable to force the receiving IC 14 to select one orientation or another, thereby allowing intermittent errors related to the asynchronous nature of the selection of the select signal to become repeatable. The present invention addresses this problem by providing selectable delays of the data and clock signal in sending IC 12.

Figure 8:
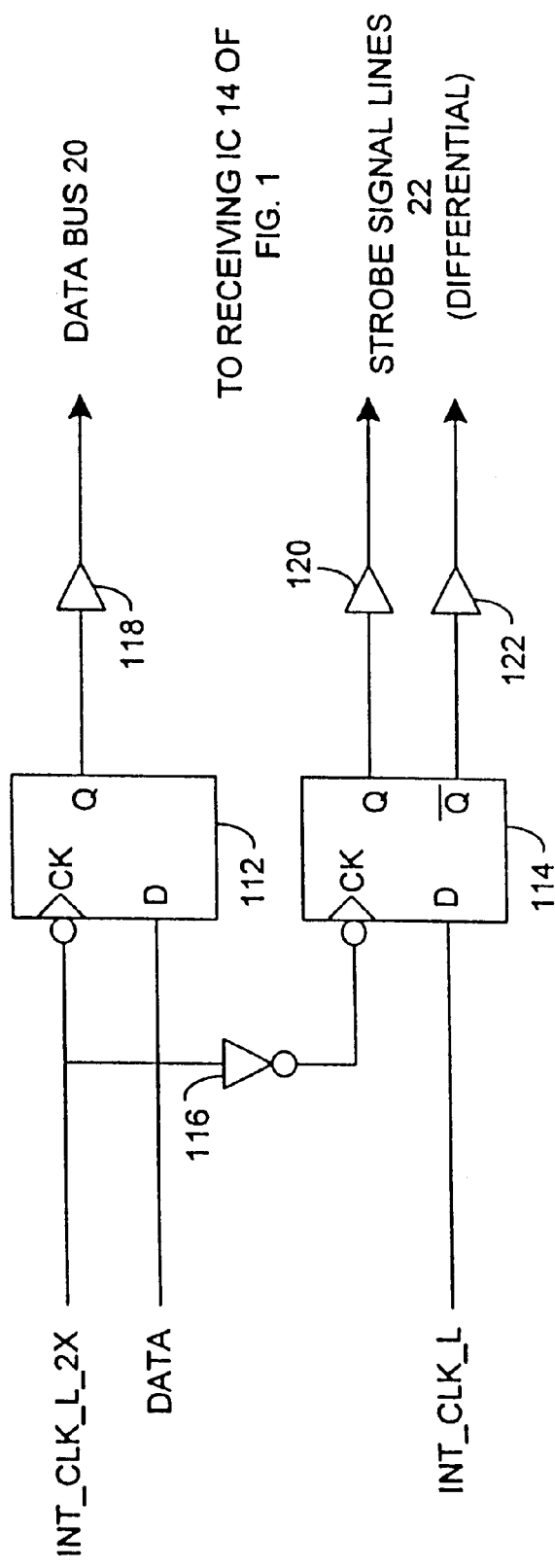
FIG. 8 is an example of prior art logic used within a sending IC shown in FIG. 1.

Before discussing the present invention, first consider prior art circuit 110 of FIG. 8. Circuit 110 is an example of the logic used within sending IC 12 of FIG. 1 in a digital system designed in accordance with the scheme disclosed by Rogers. Circuit 110 comprises flip flops 112 and 114, inverter 116, and I/O drivers 118, 120, and 122.

Flip flop 112 is driven by the signal INT_CLK_L_2X. This signal has twice the frequency of the signal INT_CLK_L. Signal INT_CLK_L_2X is inverted by inverter 116 and is supplied to flip flop 114.

The D input of flip flop 114 receives the signal INT_CLK_L, and produces the differential strobe signal at its Q and inverted Q outputs. The differential strobe signal passes through I/O buffers 120 and 122 and is driven to receiving IC 14 of FIG. 1 via strobe signal lines 22.

The data being sent to receiving IC 14 is presented to the D input of flip flop 112. As discussed above, the data is validated by each validation edge of the strobe signal (rising and falling edges) so a new data bit is provided for each full cycle of the signal INT_CLK_L_2X. The Q output of flip flop 112 is provided to I/O buffer 118, and to data bus 20 of FIG. 1 to transmit the data to receiving IC 14. Since flip flop 114 is clocked by the inverse of the signal INT_CLK_L_2X, the validation edges of the strobe signal are delayed by ½ of a cycle of the signal INT_CLK_L_2X, thereby centering each validation edge of the strobe signal in the middle of the read window of the data signal.

Figure 9:
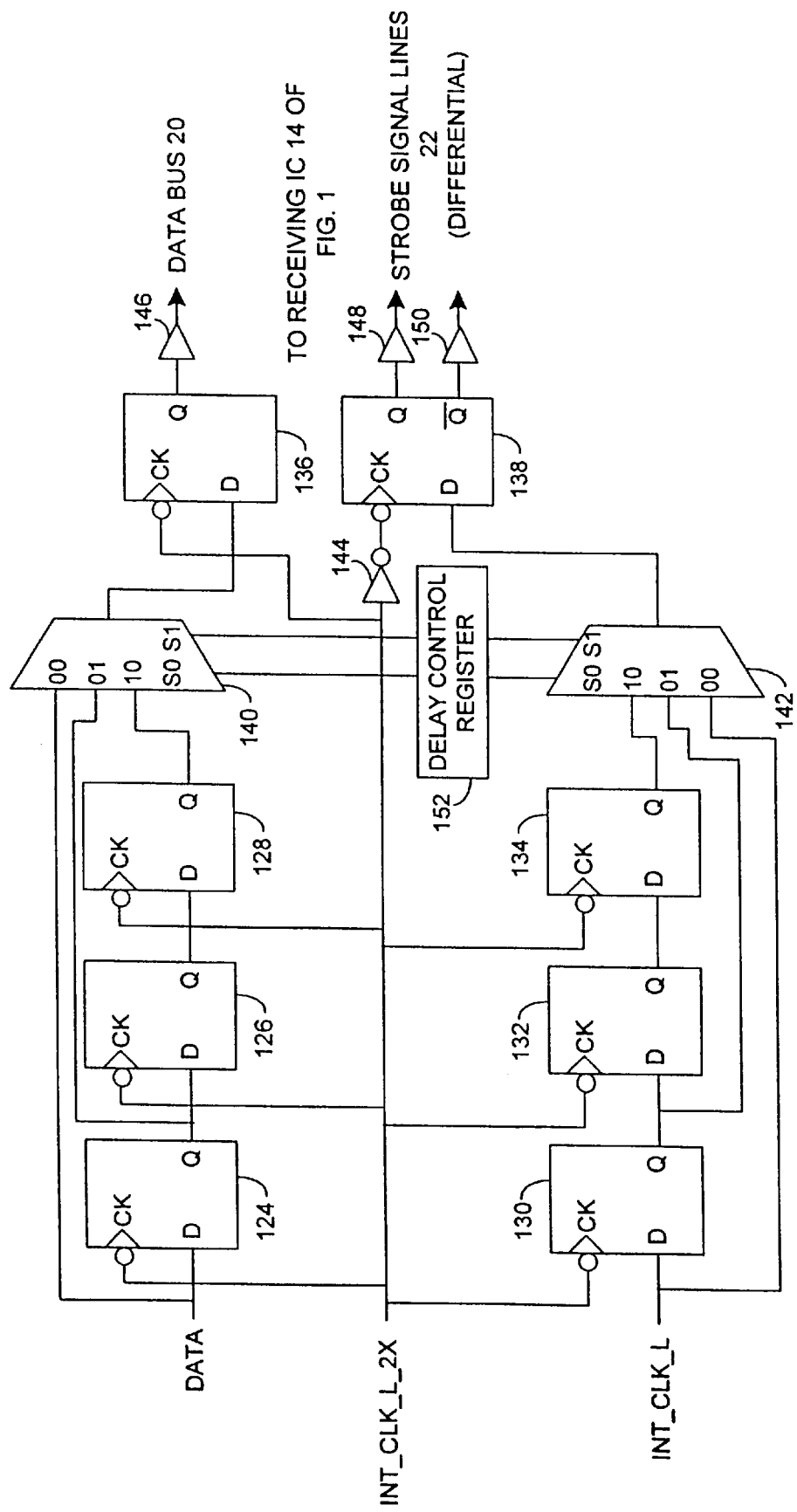
FIG. 9 shows a portion of the sending IC of FIG. 1 and illustrates how the clock and data signals can be delayed to force synchronous operation of a receiving IC 14 in FIG. 1, in accordance with the present invention.

FIG. 9 shows a portion of sending IC 12 and illustrates how the clock and data signals can be delayed to force a synchronous operation of receiving IC 14, in accordance with the present invention. The portion of IC 12 shown in FIG. 9 includes flip flops 124, 126, 128, 130, 132, 134, 136, and 138, multiplexers 140 and 142, inverter 144, I/O buffers 146, 148, and 150, and delay control register 152. As will be seen in greater detail below with reference to FIGS. 10 and 11, the present invention delays both the clock and data signals by either one or three validation edges of the strobe signal, thereby forcing the phase detection circuit of FIG. 6 to select one orientation or the other.

Determination of whether a particular receiving IC may exhibit asynchronous behavior in choosing the orientation of the select signal may be accomplished using several methods. For example, one may use an oscilloscope to look at the input and output clock relationships of receiving IC 14. Furthermore, some ASICs have the ability to selectively multiplex signals to output pins so that the signals may be observed. Asynchronous behavior may also be predicted using various simulation techniques. Finally, it may be desirable to randomly alter the delays to see if intermittent problems become repeatable, or to reveal latent bugs that were not previously observed.

Returning to FIG. 9, delay control register 152 stores a two bit value that determines the delay. Note that register 152 can be loaded using a variety of techniques known in the art, such as including register 152 in an initialization scan chain, or configuring register 152 to be loaded by a CPU write. Alternatively, the two bits provided by register 152 can be provided via I/O pins.

When delay control register contains the value "00", the circuit of FIG. 9 operates in a manner similar to circuit 110 of FIG. 8. The signal "data" is routed though multiplexer 140 to the Q input flip flop 136 and the signal INT_CLK_L is routed though multiplexer 142 to the Q input of flip flop 138. Flip flop 136 is clocked by the signal INT_CLK_L_2X, and the Q output of flip flop 136 is coupled to I/O buffer 146, which in turn is coupled to data bus 20 to send the data signal to receiving IC 14 of FIG. 1. The signal INT_CLK_L_2X is inverted by inverter 144 and is provided to the CK input of flip flop 138. The Q and inverted Q outputs of flip flop 138 are coupled to I/O buffers 148 and 150, respectively, which in turn drive differential strobe signal lines 22 to receiving IC 14.

When it is desired to force the orientation of the select signal, delay control register 152 can be loaded with the values "01" or "10". When register 152 contains the value "01", the Q output of flip flop 124 is routed to the D input of flip flop 136 via multiplexer 140, and the Q output of flip flop 130 is routed to the D input of flip flop 138 via multiplexer 142. Accordingly, when register 152 contains the value "01", the clock and data signals are delayed by one cycle of the signal INT_CLK_L_2X, or alternatively, ½ of a cycle of the signal INT_CLK_L. This is equivalent to one validation edge of the strobe signal. Similarly, When register 152 contains the value "10", the Q output of flip flop 128 is routed to the D input of flip flop 136 via multiplexer 140, and the Q output of flip flop 134 is routed to the D input of flip flop 138 via multiplexer 142. Accordingly, when register 152 contains the value "10", the clock and data signals are delayed by three cycles of the signal INT_CLK_L_2X, or alternatively, 1 and ½ cycles of the signal INT_CLK_L. This is equivalent to three validation edges of the strobe signal.

As discussed above, FIG. 7 shows the worst case timing in the system disclosed by Rogers. Assume that this timing is produced by the circuit shown in FIG. 9 when delay control register 152 contains the value "00". Now assume that delay control register 152 is loaded with the value "01". The resulting timing diagram is shown in FIG. 10.

Figure 10:
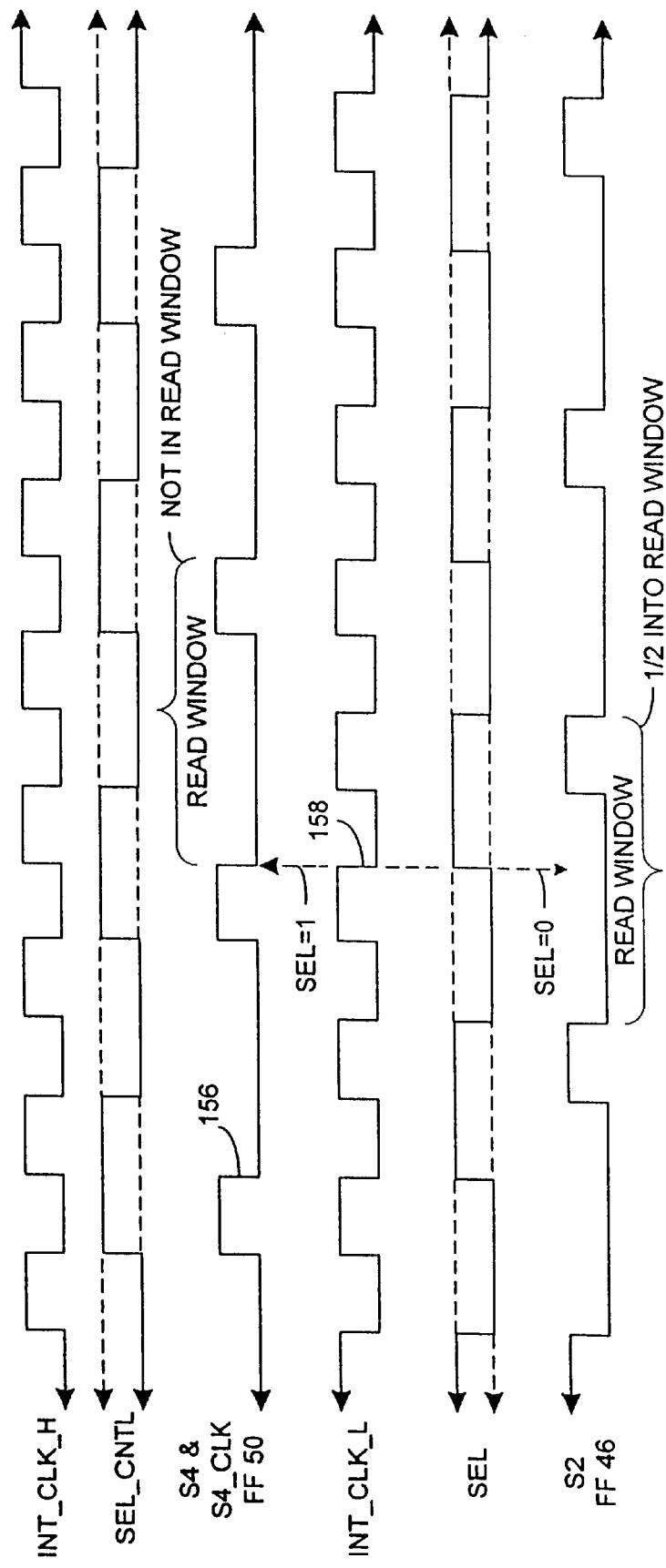
FIG. 10 is a timing diagram wherein the signals that are in the clock domain of the sending IC of FIG. 1 have been delayed by one validation edge (compared with the timing diagram of FIG. 7) of the strobe signal carried by strobe signal lines shown in FIG. 1, in accordance with the present invention.

In contrast to FIG. 7, the signals shown in FIG. 10 that are in the clock domain of sending IC 12 (S4 and S4_CLK, and S2) have been delayed by one validation edge of the strobe signal carried by strobe signal lines 22 of FIG. 1. As discussed above with reference to FIG. 7, if the signal SEL_CNTL is "1" at the falling edge of the signal S4_CLK, the orientation of the signal SEL is correct and does not need to be toggled. However, if the signal SEL_CNTL is "0" at the falling edge of the signal S4_CLK, the orientation of the signal SEL is must be toggled. Returning to FIG. 10, note that the falling edge 156 of the signal S4_CLK occurs between the edges of the signal SEL_CNTL. Accordingly, the circuit shown in FIG. 6 will either toggle or not toggle the orientation of the select signal to assume the solid line orientation of the signals SEL_CNTL and SEL. Accordingly, at edge 158 the signal SEL will by "0" and flip flop 46 will be read. Note that edge 158 is ½ into the read window of flip flop 46. In contrast, edge 158 is not in the read window of flip flop 50. Accordingly, when delay control register 152 is loaded with the value "01", the present invention forces synchronous operation using the solid line orientation shown in FIG. 10. Any hardware bug that only manifests itself in this orientation will now be repeatable.

Figure 11:
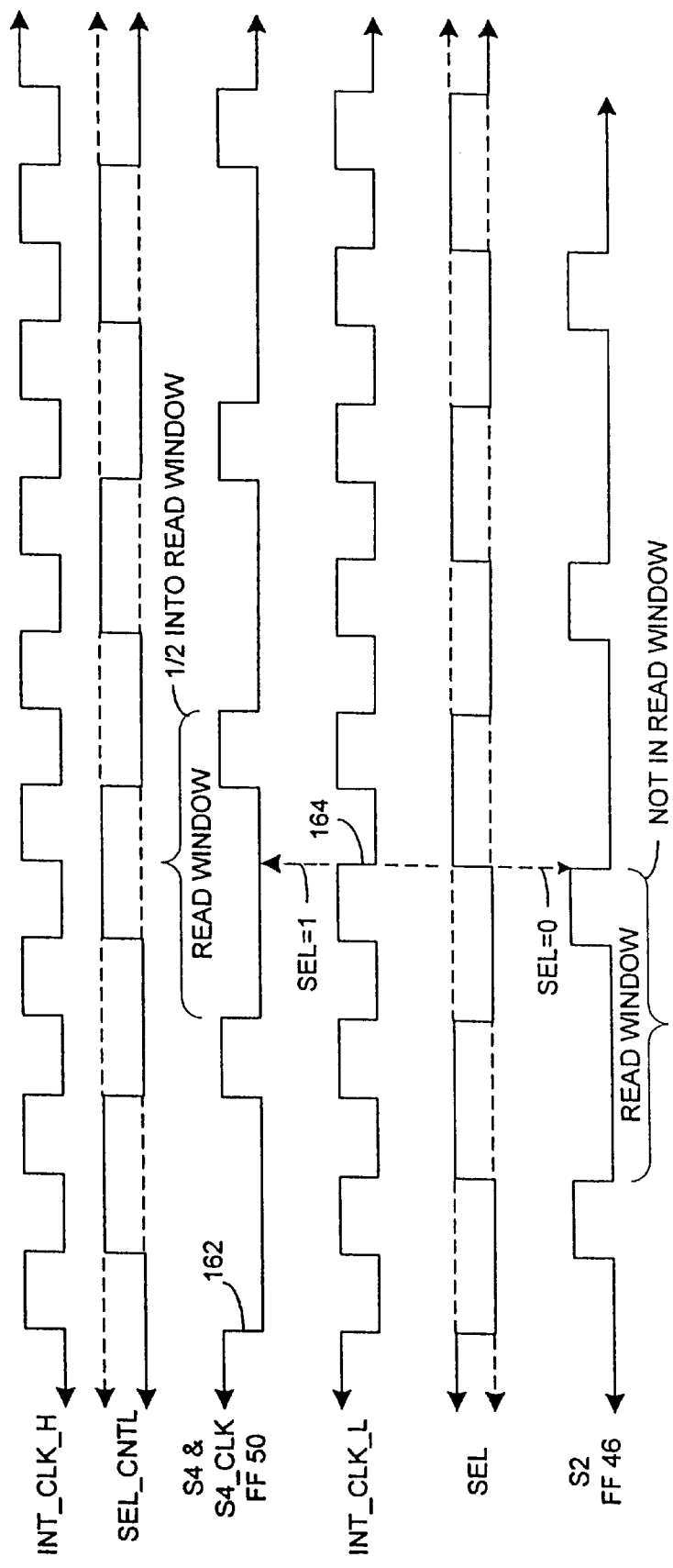
FIG. 11 is a timing diagram wherein the signals that are in the clock domain of the sending IC of FIG. 1 have been delayed by three validation edge (compared with the timing diagram of FIG. 7) of the strobe signal carried by strobe signal lines shown in FIG. 1.

Now assume that delay control register 152 is loaded with the value "10". The resulting timing diagram is shown in FIG. 11. In contrast to FIG. 7, the signals shown in FIG. 11 that are in the clock domain of sending IC 12 (S4 and S4_CLK, and S2) have been delayed by three validation edges of the strobe signal carried by strobe signal lines 22 of FIG. 1. As in FIG. 10, note that the falling edge 162 of the signal S4_CLK occurs between the edges of the signal SEL_CNTL. Accordingly, the circuit shown in FIG. 6 will either toggle or not toggle the orientation of the select signal to assume the dotted line orientation of the signals SEL_CNTL and SEL. Accordingly, at edge 164 the signal SEL will by "1" and flip flop 50 will be read. Note that edge 164 is ½ into the read window of flip flop 50. In contrast, edge 164 is not in the read window of flip flop 46. Accordingly, when delay control register 152 is loaded with the value "10", the present invention forces synchronous operation using the dotted line orientation shown in FIG. 11. Any hardware bug that only manifests itself in this orientation will now be repeatable.

Figure 12:
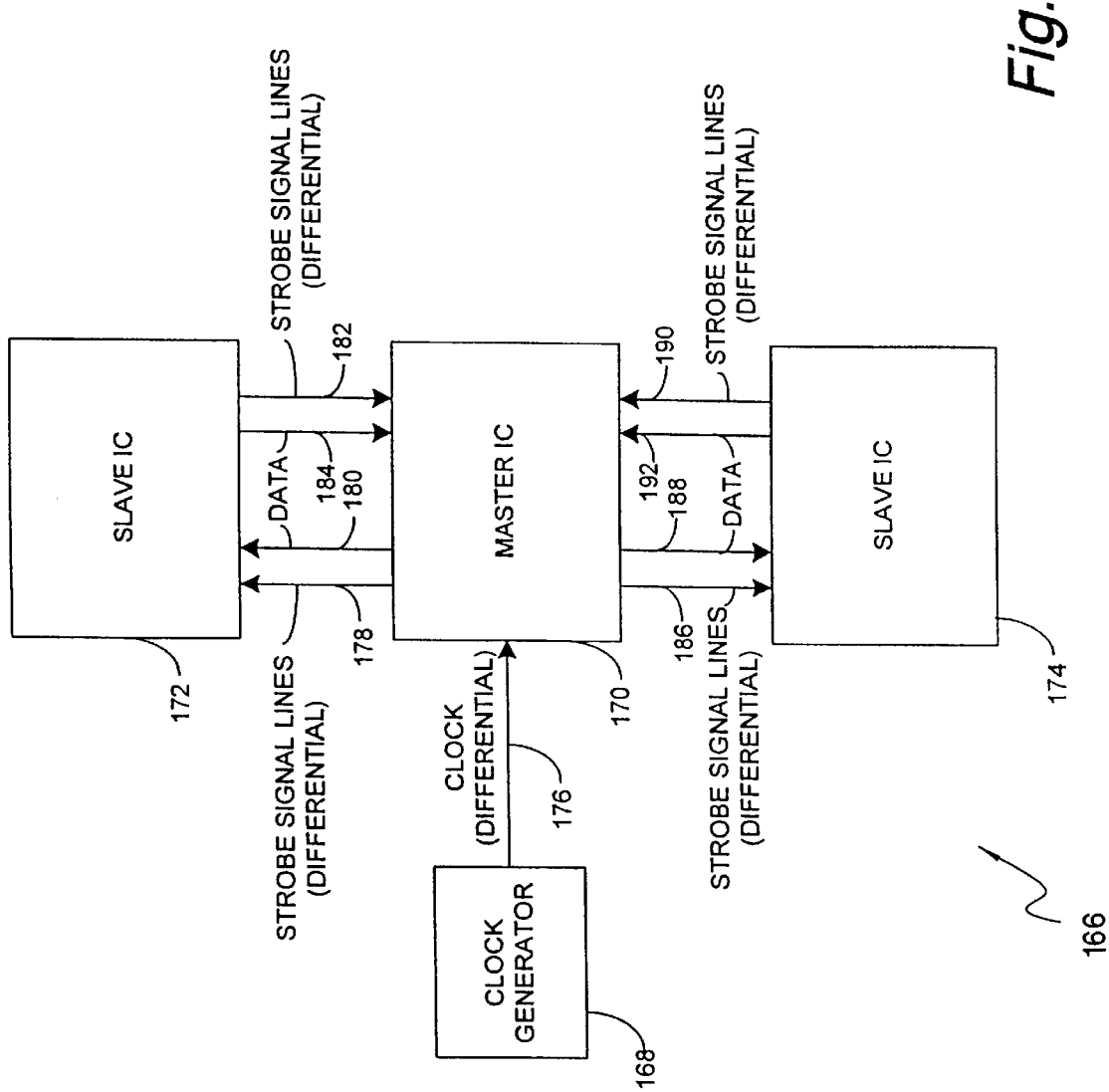
FIG. 12 illustrates a configuration that eliminates some of the I/O pins required to distribute the clock signal, and reduces the number of instances of the delay circuit shown in FIG. 9, and the synchronization and phase detection circuitry shown in FIGS. 2, 4, and 6, compared to the configuration shown in FIG. 1.

In FIG. 1, receiving IC 14 receives clock signals from both clock generator 16 and sending IC 12. Note that in a typical digital system, IC 14 will also usually send data to IC 12. To send data from IC 14 to IC 12, IC 14 will also require the delay circuit shown in FIG. 9, and IC 12 will also require the synchronization and phase detection circuitry shown in FIGS. 2, 4, and 6. FIG. 12 illustrates a configuration 166 that eliminates some of the I/O pins required to distribute the clock signal, and reduces the number of instances of the delay, synchronization, and phase detection circuitry.

In FIG. 12, clock generator 168 generates a clock signal that is provided to master IC 170 via clock network 176. Master IC 170 sends data to slave IC 172 via strobe signal lines 178 and data bus 180, and master IC 170 receives data from slave IC 172 via strobe signal lines 182 and data bus 184. Similarly, master IC 170 sends data to slave IC 174 via strobe signal lines 186 and data bus 188, and master IC 170 receives data from slave IC 174 via strobe signal lines 190 and data bus 192.

Each slave IC uses the strobe signal provided by master IC 170 as its internal clock signal, which in turn is used to generate the strobe signal that is sent back to master IC 170. Accordingly, the slave ICs do not need to be coupled to clock generated 168, thereby eliminating two I/O pins from each slave IC. Furthermore, since the same clock that is used to send data to the slave ICs is also used as an internal clock in the slave ICs, the slave ICs do not need the synchronization and phase detection circuitry shown in FIGS. 2, 4, and 6. In addition, the slave ICs do not need to have the delay circuitry shown in FIG. 9. Master IC 170 can control the delay of the clock and data received from the slave ICs by delaying the clock and data sent to the master ICs. Accordingly, only master IC 170 must have the synchronization and phase detection circuitry shown in FIGS. 2, 4, and 6, and the delay circuitry shown in FIG. 9.

Although the present invention has been described with reference to preferred embodiments, workers skilled in the art will recognize that changes may be made in form and detail without departing from the spirit and scope of the invention.

What is claimed is:

1. A method of forcing a particular orientation of a select signal that is used to route data from flip flops configured in a round robin scheme and activated by signals in a clock domain of a sending portion of a digital circuit to one or more flip flops clocked by signals in a clock domain of a receiving portion of the digital circuit comprising:

selectively delaying a strobe signal and a data signal having read windows validated by the strobe signal to force a particular orientation of the select signal, wherein the strobe signal and data signal are provided by the sending portion of the digital circuit;

generating intermediate activation signals for the flip flops configured in the round robin scheme from the strobe signal;

generating the select signal;

comparing a phase of a signal derived from one or more of the intermediate activation signals with a phase of the select signal; and toggling the orientation of the select signal if the select signal does not have a correct phase relationship with respect to the intermediate activation signals.

* * * * *